(12) United States Patent
Hara (10) Patent No.: US 8,905,768 B2
(45) Date of Patent: Dec. 9, 2014

(54) CHARGING CONNECTOR

(75) Inventor: Nobuhiko Hara, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 152 days.

(21) Appl. No.: 13/699,409

(22) PCT Filed: May 24, 2011

(86) PCT No.: PCT/JP2011/061811
§ 371 (c)(1),
(2), (4) Date: Dec. 28, 2012

(87) PCT Pub. No.: WO2011/148919
PCT Pub. Date: Dec. 1, 2011

(65) Prior Publication Data
US 2013/0095678 A1 Apr. 18, 2013

(30) Foreign Application Priority Data
May 25, 2010 (JP) .................................. 2010-119526

(51) Int. Cl.
*H01R 13/44* (2006.01)
*B60L 11/18* (2006.01)
*H01R 13/447* (2006.01)
*H01R 13/52* (2006.01)

(52) U.S. Cl.
CPC ......... *B60L 11/1809* (2013.01); *B60L 11/1818* (2013.01); *H01R 13/447* (2013.01); *H01R 13/5213* (2013.01); *Y02T 90/121* (2013.01); *Y02T 90/14* (2013.01); *B60L 2230/12* (2013.01); *Y02T 10/7088* (2013.01); *Y02T 10/7005* (2013.01)
USPC ........................................................ 439/136

(58) Field of Classification Search
CPC ............. H01R 13/447; H01R 13/5213; H01R 13/4534; H01R 13/506; H01R 13/74; H01R 13/6315; H05K 5/0278
USPC .......................... 439/136, 34, 142; 296/97.22
See application file for complete search history.

(56) References Cited

U.S. PATENT DOCUMENTS

| 4,527,825 A | * | 7/1985 | Clouse | ........................ 296/97.22 |
| 4,811,984 A | * | 3/1989 | Hempel | ..................... 296/97.22 |

(Continued)

FOREIGN PATENT DOCUMENTS

| JP | 61163019 A | 7/1986 |
| JP | 2005319960 A | 11/2005 |
| JP | 2009087759 A | 4/2009 |

OTHER PUBLICATIONS

English Translation of International Preliminary Report on Patentability, PCT/JP2011/061811 filed May 24, 2011.

(Continued)

*Primary Examiner* — Amy Cohen Johnson
*Assistant Examiner* — Vladimir Imas
(74) *Attorney, Agent, or Firm* — Barnes & Thornburg LLP (57) ABSTRACT

A charging connector having a connector connection section disposed within an opening in the vehicle to which a plug is connected; an outer lid section which covers the opening; a resin arm which is pivotably supported within the opening and is bent so as to bypass the opening; and an outer lid hinge which allows the arm to pivot in a plane substantially perpendicular to the plane formed by the opening. The arm has an extended section which describes a circular arc centering on the outer lid hinge, and also has a base section (root section). The portion of the opening which is located near the arm is substantially circular-arc-shaped.

3 Claims, 4 Drawing Sheets

(56) References Cited

U.S. PATENT DOCUMENTS

| | | | |
|---|---|---|---|
| 5,044,678 A * | 9/1991 | Detweiler | 292/144 |
| 5,580,258 A * | 12/1996 | Wakata | 439/142 |
| 5,588,853 A * | 12/1996 | Anthony | 439/136 |
| 5,664,811 A * | 9/1997 | Martus et al. | 292/144 |
| 6,189,959 B1 * | 2/2001 | VanAssche et al. | 296/207 |
| 6,508,501 B1 * | 1/2003 | Meinke | 296/97.22 |
| 7,311,348 B1 * | 12/2007 | Bang et al. | 296/97.22 |
| 7,549,694 B2 * | 6/2009 | Scott et al. | 296/97.22 |
| 7,740,301 B2 * | 6/2010 | Hirano | 296/97.22 |
| 7,794,280 B1 * | 9/2010 | Markyvech | 439/620.29 |
| 7,967,361 B2 * | 6/2011 | Scott et al. | 296/97.2 |
| 7,988,453 B2 * | 8/2011 | Loo et al. | 439/34 |
| 8,162,375 B2 * | 4/2012 | Gurtatowski et al. | 296/97.22 |
| 8,382,188 B2 * | 2/2013 | Woodworth et al. | 296/97.22 |
| 8,454,375 B2 * | 6/2013 | Bauer | 439/135 |
| 8,684,443 B2 * | 4/2014 | Hara | 296/97.22 |
| 2007/0040409 A1 * | 2/2007 | Alfaro | 296/97.22 |
| 2008/0136210 A1 * | 6/2008 | Scott et al. | 296/97.22 |
| 2010/0072774 A1 * | 3/2010 | Bar | 296/97.22 |
| 2011/0025087 A1 * | 2/2011 | Ramos | 296/97.22 |
| 2011/0285165 A1 * | 11/2011 | Baba et al. | 296/97.22 |
| 2013/0076059 A1 * | 3/2013 | Zalan et al. | 296/97.22 |

OTHER PUBLICATIONS

Search Report for International Patent Application No. PCT/JP2011/061811; Jun. 28, 2011.

* cited by examiner

CHARGING CONNECTOR

PRIORITY CLAIM

This patent application is a U.S. National Phase of International Patent Application No. PCT/JP2011/061811, filed 24 May 2011, which claims priority to Japanese Patent Application No. 2010-119526, filed 25 May 2010, the disclosures of which are incorporated herein by reference in their entirety.

TECHNICAL FIELD

The present invention relates to a charging connector which is provided in a vehicle mounted with a battery chargeable from an external power supply and into which a charging cable is inserted.

BACKGROUND ART

In recent years, automobiles that rely on electric motors as power sources, such as an electric automobile and a hybrid car, have been spreading. Batteries that supply electricity to the electric motors are mounted on such automobiles.

As a method of charging the batteries, a plurality of methods are known according to types or kinds of the batteries and the automobiles. For example, a large number of hybrid cars operate generators to generate power by using power from engines and to charge the batteries. In some of electric automobiles and hybrid cars (plug-in hybrid cars), it is possible to insert a charging cable into the vehicles and directly charge the batteries from an external power supply.

Such a plug-in hybrid car or the like is provided with a charging connector or the like for receiving the charging cable inserted into the vehicles (as disclosed in, for example, Patent Document 1). The charging connector described in Patent Document 1 includes a charging port structure. The charging connector of the plug-in hybrid car or the like is mainly provided in an outer panel, a bumper, or the like of the vehicle and covered with a lid body (a lid) for protection from an outer side. A hinge for opening and closing the lid is located on an inside of an opening formed in the outer panel or the like and is configured not to be exposed to the outside.

As the lid located on the outer panel or the like of the vehicle, there is well known a lid (a fuel lid) that covers a fuel filler opening) as described in, for example, Patent Document 2). In a fuel filler lid structure described in Patent Document 2, a fuel filler lid (hereinafter simply referred to as "lid") is openably and closably supported by a hinge arm (an arm) extending in a U-shape from the inside of the opening.

PRIOR ART DOCUMENT

Patent Document

Patent Document 1: Japanese Patent Application Laid-Open Publication No. 2009-87759
Patent Document 2: Japanese Patent Application Laid-Open Publication No. 2005-319960

DISCLOSURE OF THE INVENTION

Problems to be Solved by the Invention

In recent years, it has been required for the charging connector represented by the charging port structure described in Patent Document 1 to reduce a size and make compact a structure thereof with the progress of technology.

However, for example, among components of the charging port structure described in Patent Document 1, a charging port (a connector connecting portion) cannot be imprudently reduced in size because the charging port is designed according to a standard or like. Therefore, in order to reduce the entire size of the charging port structure, it is desirable to set the respective components or parts closely and in compact. However, an arm that supports the lid from the inside of the opening has a hinge structure for a lid, and since the arm is rotated in the opening, it is necessary to set the arm so as to avoid interference with the respective components.

The arm illustrated in Patent Document 2 is described more in detail than in Patent Document 1. In a configuration described in Patent Document 2, the arm is formed in a U-shape to be capable of avoiding interference with an edge of an opening portion. However, the lid described in Patent Document 2 is a component for only covering the fuel filler opening, and since a basic structure of the fuel filler opening is a hole, the fuel filler opening is positioned deeply into the opening portion. In this regard, in a configuration of the charging connector, for convenience of connection, a connector connecting portion is arranged in a manner of projecting near a vicinity of the opening portion. Therefore, if the arm described in Patent Document 2 is directly adopted, in order to avoid the interference with the connector connecting portion, it is necessary to secure a large space between the arm and the connector connecting portion.

Furthermore, since the arm is a component that supports the lid, it is necessary to secure rigidity of the arm. For example, if the arm is made of metal, although it is relatively easy to secure rigidity, on the other hand, it is demanded for the arm to be integrally molded with the lid.

Moreover, when the charging connector is located in a bumper made of resin, it is desirable, in view of an external appearance, to form the lid with the same material as a material of the bumper, and it is desired to form the arm with resin like the bumper. Furthermore, since the resin has lower rigidity than metal, the arm needs to secure rigidity due the shape thereof, and accordingly, it is necessary to consider so as not to lose the rigidity even in reducing the size of the arm.

In consideration of the circumstances mentioned above, an object of the present invention is to provide a charging connector capable of realizing space saving function of an internal space of the opening portion and reducing size of the entire structure of the charging connector while securing the rigidity of an arm of the charging connector.

Means for Solving the Problems

A charging connector according to a preferred embodiment of the present invention for achieving the above object is a charging connector which charges a battery mounted on a vehicle from an external power supply through an opening portion formed to the vehicle, the charging connector including: a connector connecting portion which is arranged in an inside of the opening portion and to which a plug of a cable for charging the battery of the vehicle is connected; an outer lid member that covers the opening portion from an outside of the vehicle; an arm made of resin axially supported on the inside of the opening portion, bent to detour an edge of the opening portion, and connected to the outer lid member; and an outer lid hinge located in the inside of the opening portion so as to pivot the arm in a plane substantially orthogonal to a plane formed by the opening portion, wherein the arm includes an extending portion connected to the outer lid member to draw an arcuate shape with the outer lid hinge being a center thereof and a base portion that couples the extending portion and the outer lid hinge, and the opening portion is formed in a substantially arcuate shape at least in a vicinity of the arm and, in a vertical cross section taken along a plane formed by the opening portion, an outer surface of the extending portion opposing to an edge of the opening portion curves so as to be protruded toward the outer lid hinge and an inner surface of the extending portion on the connector connecting portion side curves so as to be recessed toward the outer lid hinge.

In the above embodiment, it may be desired that, in the vertical cross section taken along the plane formed by the opening portion, the outer surface of the extending portion is formed in an arcuate shape extending along a shape of an inner circumference of the opening portion.

It may be also desired that, in the vertical cross section taken along the plane formed by the opening portion, the inner surface of extending portion is formed in an arcuate shape extending along a circle concentric with the connector connecting portion.

It may be further desired that the charging connector further includes an inner lid member that seals a connector connecting portion in the inside of the opening portion, wherein a distance from the plane formed by the opening portion to the outer lid hinge is set substantially equal to a distance from the above-mentioned plane to the inner lid member.

Effects of the Invention

According to the structure or configuration mentioned above, since the outer surface of the extending portion curves in the convex (protruded) shape, the extending portion can be arranged close to the edge of the opening portion, and in addition, since the inner surface of the extending portion curves in the concave (recessed) shape, the extending portion can be arranged close to the connector connecting portion as well. Further, since the extending portion draws the arcuate shape with the outer lid hinge being the center thereof, even if the arm is pivoted, distance between the extending portion and the edge of the opening portion or the connector connecting portion is fixed (constant) and the extending portion is unlikely to interfere with the edge of the opening portion or the connector connecting portion. Therefore, according to the above structure, it is possible to achieve the space saving function of an internal space of the opening portion.

According to the structure of the extending portion mentioned above, it becomes possible to widen the width in a longitudinal direction of the arm (the extending portion) with no interference of the extending portion with the opening portion. Further, since the outer surface and the inner surface of the extending portion curve respectively in the protruded shape and the recessed shape toward the outer lid hinge, the geometrical moment of inertia is made larger. Therefore, the arm including the extending portion can provide and ensure the high rigidity even if the arm is made of resin. Therefore, it is possible to form the lid and the arm with the same material as a material of a bumper. It is possible to obtain a sense of unity in design, and thus, improve outer appearance.

According to the structure mentioned above, it is also possible to realize the space saving of the internal space of the opening portion while securing the rigidity of the arm. Therefore, it is possible to provide a charging connector that can be further reduced in size as a whole.

Furthermore, in the vertical cross section taken along the plane formed by the opening portion, the outer surface of the extending portion is desirably formed in an arcuate (circular-arc) shape extending along the shape of the inner circumference of the opening portion. Thus, according to such outer surface having the arcuate shape, the spacing efficiency at a time when the extending portion passes the opening portion can be improved. Therefore, it is possible to promote the space saving efficiency of the internal space of the opening portion.

Still furthermore, in the vertical cross section taken along the plane formed by the opening portion, the inner surface of the extending portion is desirably formed in an arcuate shape extending along a circle concentric with the connector connecting portion. According to such inner surface having the arcuate shape, wide margin can be secured in a space existing further on the connector connecting portion side than the extending portion side. Therefore, it is possible to set the connector connecting portion in a position closer to the extending portion to thereby facilitate the space saving function of the internal space of the opening portion.

The charging connector further includes the inner lid member that seals the connector connecting portion in the inside of the opening portion, and the distance from the plane formed by the opening portion to the outer lid hinge is set substantially equal to the distance from the plane to the inner lid member. Accordingly, since the charging connector includes the inner lid member, it is possible to surely protect a terminal of the connector connecting portion. In addition, since the outer lid hinge and the inner lid member are arranged in the positional relation of the configuration mentioned above, a distance between the extending portion and the inner lid member is fixed (is made constant) in the arm pivoting operation. Therefore, with this positional relation, it is possible to set the arm and the inner lid member closer to each other to thereby facilitate the space saving efficiency of the internal space of the opening portion.

MODE FOR CARRYING OUT THE INVENTION

Hereunder, a preferred embodiment of the present invention will be explained in detail with reference to the accompanying drawings. Dimensions, materials, specific numerical values, and the like described in the described embodiment are merely exemplars for facilitating understanding of the invention and do not limit the present invention unless specifically noted otherwise.

Furthermore, in the present specification and the drawings, components or parts having substantially same functions and configurations are denoted with same reference numerals and signs to thereby omit redundant explanation of the components or parts, and in addition, components or parts not directly related to the present invention is omitted herein from illustration. Furthermore, in the following description, terms showing directions such as front and rear, left and right, and the like are used in a state illustrated in the drawings or in a case where a traveling direction of a vehicle is regarded as front.

Figure 1:
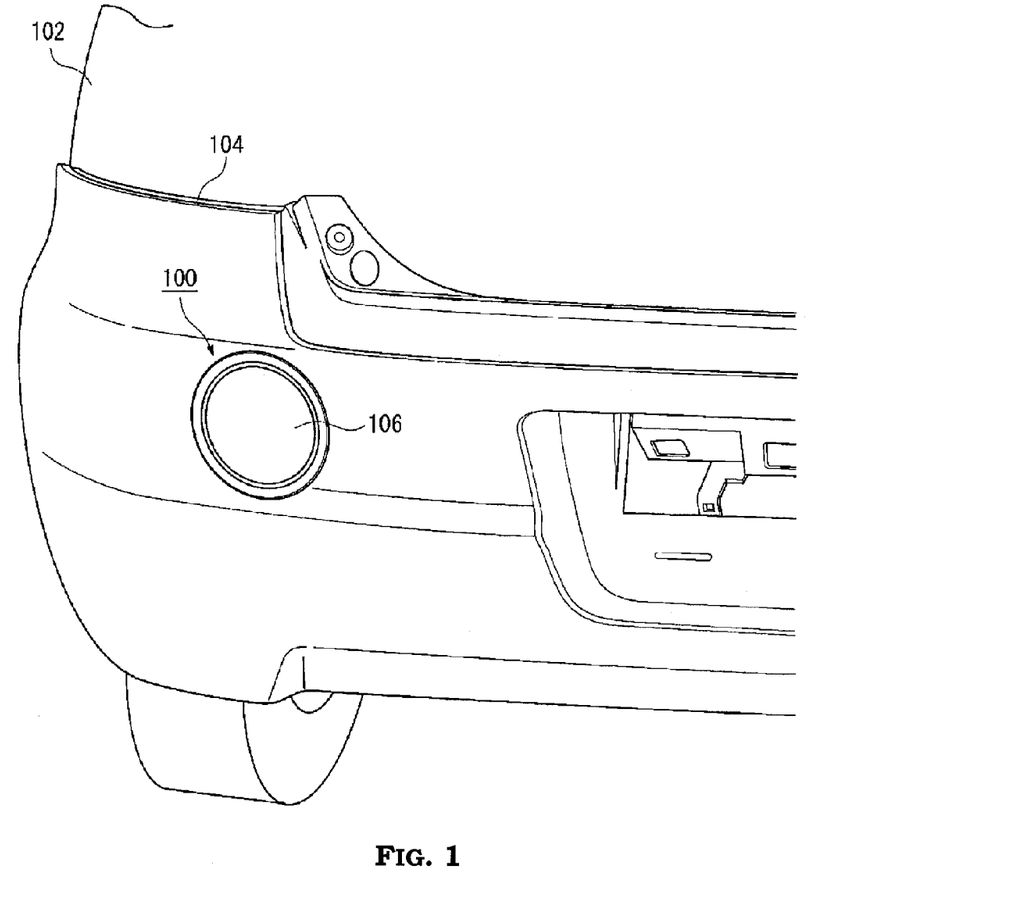
FIG. 1 is a diagram showing a part of a vehicle including a charging connector according to an embodiment.

FIG. 1 shows a part of a rear side of a vehicle 102 including a charging connector 100 according to the present embodiment. In FIG. 1, the charging connector 100 is provided in a rear bumper 104 of the vehicle 102. The charging connector 100 is used when a battery, not shown, mounted on the vehicle 102 is charged. In the present embodiment, a plug-in hybrid car is assumed as the vehicle 102.

As shown in FIG. 1, the charging connector 100 is provided with an outer lid member 106. The outer lid member 106 is a lid body also called connector lid. The outer lid member 106 is formed of the same material as a material of the rear bumper 104 to unify an external appearance or impression of the vehicle 102. In this embodiment, the rear bumper 104 and the outer lid member 106 are made of resin.

Figure 2:
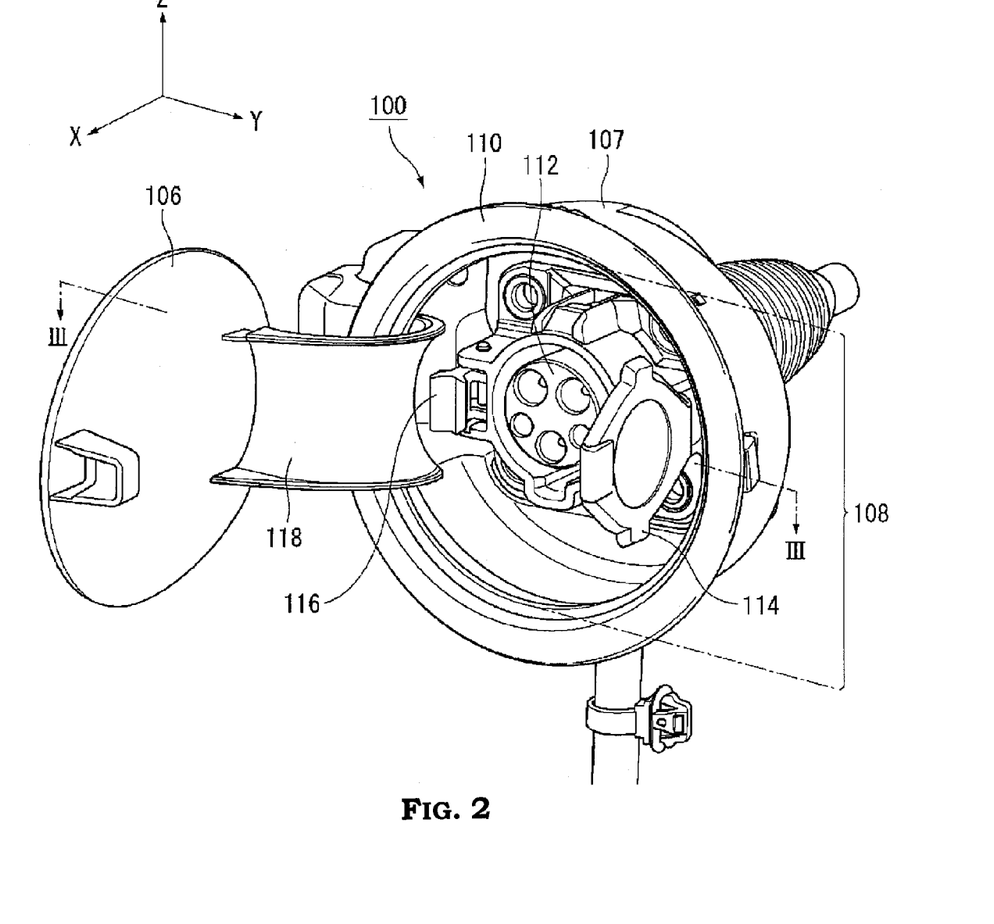
FIG. 2 is an enlarged diagram showing a state in which an outer lid of the charging connector shown in FIG. 1 is opened.

FIG. 2 shows the charging connector 100 in a state in which the outer lid member 106 shown in FIG. 1 is opened. In FIG. 2, the rear bumper 104 is not shown to facilitate understanding of components included in the charging connector 100.

As shown in FIG. 2, the charging connector 100 includes a casing 107 having a wide-mouthed bowl shape. An internal space spreads on an inner side of the casing 107. A connector connecting portion 112 and the like explained hereinafter are located to an inner wall of the casing 107.

A bezel 110 (a connector lid bezel) having an annular shape is located at an edge of the casing 107. An inner circumference of the bezel 110 forms an opening portion (opening peripheral edge) 108 of the charging connector 100. A charging cable, not shown, can be inserted into an inside of the casing 107 through the opening portion 108.

The opening portion 108 can be sealed by the outer lid member 106. Therefore, a shape of an outer circumference of the outer lid member 106 is formed so as to accord with a shape of the inner circumference of the bezel 110. When the outer lid member 106 is closed, the outer lid member 106 is fitted to the bezel 110.

In FIG. 2 and subsequent figures, a longitudinal direction of a plane formed by the opening portion 108 is represented as Z direction and a lateral direction of the plane formed by the opening portion 108, which is a direction orthogonal to the Z direction, is represented as Y direction. A direction orthogonal to the Z direction and the Y direction and indicating front and depth of the opening portion 108 is represented as X direction.

On the inside of the casing 107, the connector connecting portion 112 is arranged with a terminal surface thereof directing to the opening portion 108. The connector connecting portion 112 is connected to a battery in the vehicle 102. A plug of a charging cable, not shown, extending from an external power supply is connected to the connector connecting portion 112. An inner lid member 114 is provided on the terminal surface of the connector connecting portion 112 and is configured as a lid body that seals the connector connecting portion 112 on the inside of the casing 107. Since the inner lid member 114 is provided in the manner mentioned above, it is possible to surely protect a terminal of the connector connecting portion 112 from rainwater and the like from entering.

The inner lid member 114 is axially supported by an inner lid hinge 115 (FIG. 3) on an opposite side from an outer lid hinge 120 (FIG. 3) of the outer lid member 106. The inner lid member 114 includes, on an opposite side of the inner lid hinge 115, a locking portion 116 for locking the inner lid member 114 to the connector connecting portion 112.

The outer lid member 106 is supported by an arm 118 extending from the inside of the casing 107. The arm 118 is axially supported by the outer lid hinge 120 present on an inside of the opening portion 108, bent to detour an edge of the opening portion 108, and connected to the outer lid member 106. The arm 118 in the present embodiment is integrally molded by a resin material together with the outer lid member 106. Therefore, manufacturing process is easy and cost and weight can be reduced.

Figure 3:
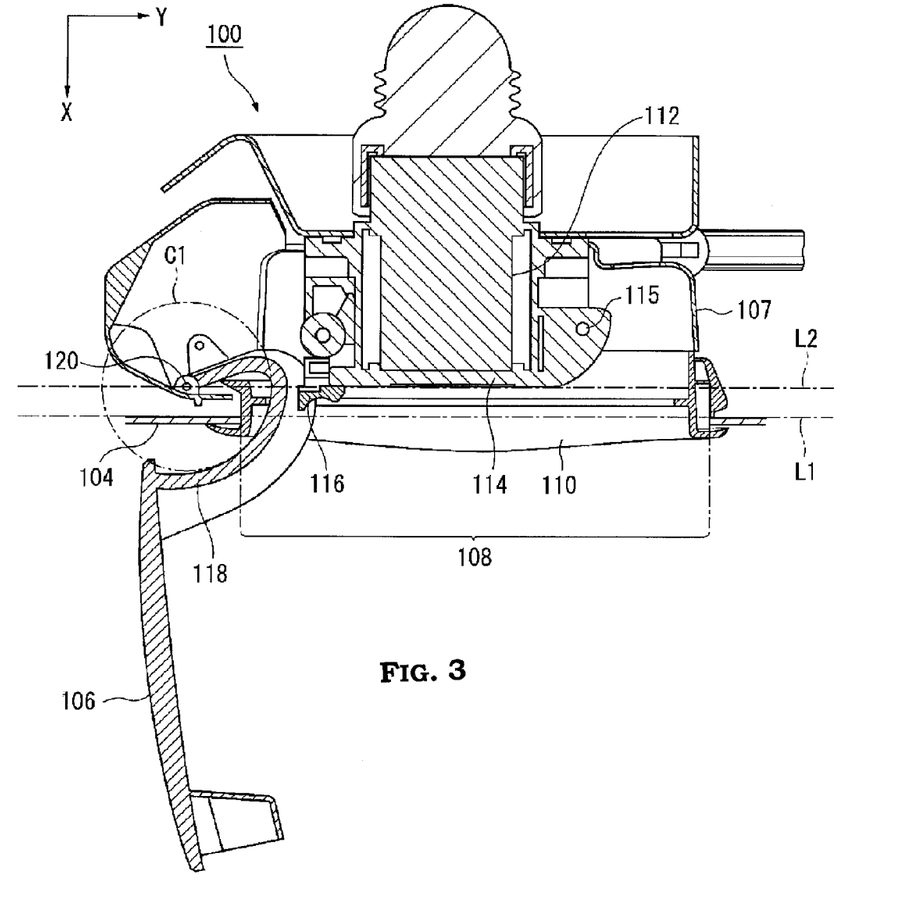
FIG. 3 is a sectional view taken along line in the charging connector shown in FIG. 2.
Figure 4:
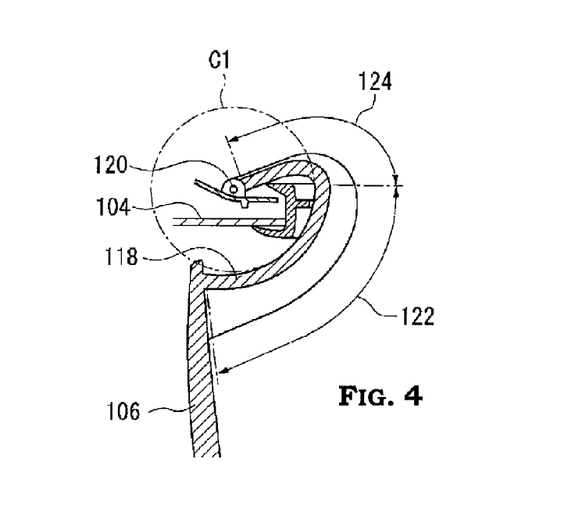
FIG. 4 is an enlarged diagram showing a vicinity of an arm provided on an inside of a casing in FIG. 3.

FIG. 3 is a sectional view taken along the line III-III in FIG. 2 of the charging connector 100. FIG. 3 shows the entire charging connector 100. FIG. 4 shows a vicinity of the arm 118 in enlargement. In FIG. 2, the cross section along the line III-III is a cross section taken along a plane (an XY plane) orthogonal to the outer lid hinge 120 in a center of the charging connector 100.

With reference to FIG. 2, the charging connector 100 is shown in a state in which the inner lid member 114 is opened in order to expose outside the connector connecting portion 112. However, in FIG. 3, the charging connector 100 is shown in a state in which the inner lid member 114 is closed.

As shown in FIG. 3, the arm 118 is axially supported by the outer lid hinge 120, which is located in a position on a rear side of the rear bumper 104 on the inside of the opening portion 108. An axis direction of the outer lid hinge 120 faces the Z direction (see FIG. 2). The outer lid hinge 120 causes the arm 118 to pivot in the X direction. In other words, the arm 118 pivots in the X-Y plane orthogonal to a Y-Z plane, which is a plane formed by the opening portion 108 shown in FIG. 2, and orthogonal to an X-Z plane.

As shown in FIG. 4, the arm 118 is provided with an extending portion 122 and a base portion (a root portion) 124. The extending portion 122 has a distal end connected to the outer lid member 106, which is the portion passing the edge of the opening portion 108 at a time when the arm 118 is pivoted. The base portion a 124 is a portion which connects the extending portion 122 and the outer lid hinge 120.

A portion C1 is a circle portion surrounded by a circle in FIGS. 3 and 4 with the outer lid hinge 120 being the center thereof. An outer surface (a surface on the outer lid hinge 120 side) of the extending portion 122 opposed to the edge of the opening portion 108 is formed to draw an arcuate (circular-arc) shape generally extending along the circle C1 in the X-Y plane. According to such shape, even if the arm 118 pivots, a distance between the extending portion 122 and the edge of the opening portion 108 and a distance between the extending portion 122 and the connector connecting portion 112 are constant (i.e., fixed) in the pivoting motion of the arm 118. Therefore, it is possible to prevent interference of the extending portion 122 with the edge of the opening portion 108 and the connector connecting portion 112.

Further, in the present embodiment, the opening portion 108, the outer lid hinge 120, and the inner lid member 114 are arranged such that a distance from the Y-Z plane (in FIG. 3, represented by a line segment L1) formed by the opening portion 108 to the outer lid hinge 120 and a distance from the Y-Z plane to the inner lid member 114 are substantially equal. Specifically, in FIG. 3, a line segment L2 connecting the outer lid hinge 120 and an end in a depth direction of a locking member 116 of the inner lid member 114 is parallel to the line segment L1 indicating the Y-Z plane. Accordingly, since the outer lid hinge 120 and the inner lid member 114 are arranged in this positional relation, a distance between the extending portion 122 and the inner lid member 114 is constant (fixed) in the pivoting motion or process of the arm 118.

As is apparent from the structure or configuration explained above, according to the present embodiment, it is possible to male close (i.e., reduce) a distance between the arm 118 and the bezel 110 and a distance between the arm 118 and the inner lid member 114. As a result, it is possible to set the bezel 110 and the inner lid member 114 closer to each other, and it is also possible to promote space saving function of an internal space of the opening portion 108.

Figure 5:
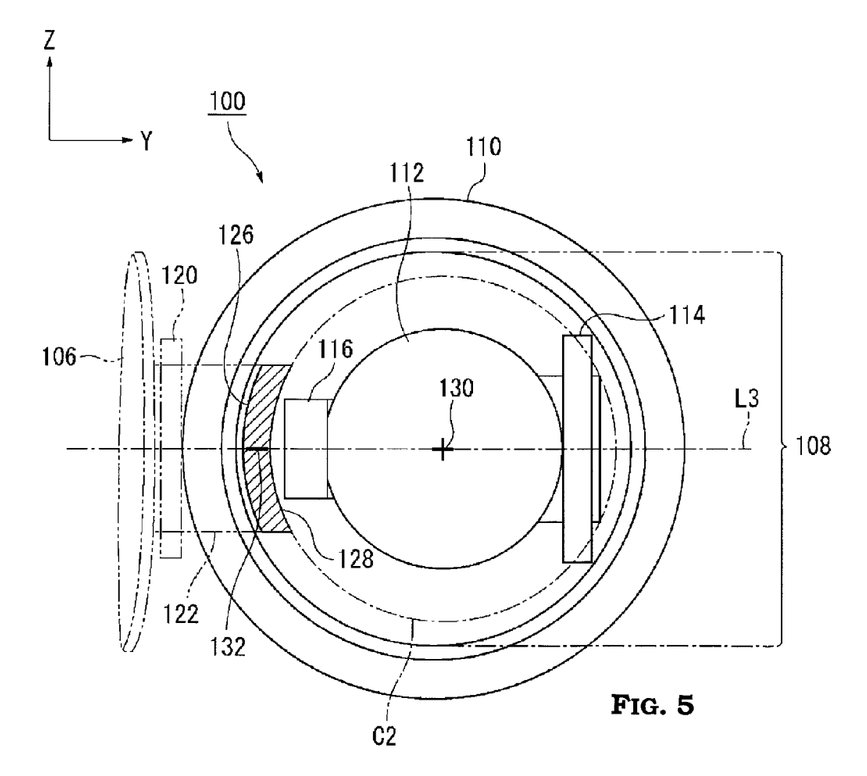
FIG. 5 is a schematic diagram showing, from a front, an opening portion of the charging connector shown in FIG. 2.

FIG. 5 is a schematic diagram showing, from the front side, the opening portion 108 shown in FIG. 2. In FIG. 5, in order to facilitate the understanding, the outer lid member 106 and the extending portion 122 are indicated by broken lines. Further, a vertical cross section of the extending portion 122 taken along the Y-Z plane formed by the opening portion 108 is indicated with hatching.

It is to be noted that, in the present embodiment, the bezel 110 is formed in a substantially circular shape. The bezel 110 (i.e., edge of the opening portion 108) is formed in an arcuate shape in a vicinity of the arm 118 (i.e., extending portion 122), and the coincidence between the center of the circular shape of the bezel 110 and the center 130 of the connector connecting portion 112 does not necessarily required (for example, in FIG. 5, the arm 118 slightly shifts by a certain degree). Further, although it is not necessarily required for the bezel to be formed in a complete circular shape, the bezel 110 is desirably formed in an arcuate shape in the vicinity of the arm 118 because of reasons explained hereinafter.

In the vertical cross section of the extending portion 122, an outer surface 126 opposing to the edge of the opening portion 108 (the inner circumference of the bezel 110) curves so as to protrude toward the outer lid hinge 120. In the described embodiment, this curve of the outer surface 126 is an arcuate shape extending along the shape of the inner circumference of the opening portion 108. Since the outer surface 126 is formed in the arcuate shape as described above, it is possible to set the extending portion 122 as close as possible to the edge of the opening portion 108, thereby improving the spacing efficiency between the arm 118 and the bezel 110.

Furthermore, in the vertical cross section of the extending portion 122, an inner surface 128 on the connector connecting portion 112 side curves so as to be recessed toward the outer lid hinge 120. In this embodiment, since the curve of the inner surface 128 is an arcuate shape extending along a circle C2 concentric with the connector connecting portion 112 as described above, it is possible to make the distance from the connector connecting portion 112 maximum. Therefore, for example, although the locking member 116 is pivoted at a time of locking the inner lid member 114, the locking member 116 does not come into contact with the inner surface 128, and accordingly, it is possible to locate the connector connecting portion 112 in a position closer to the extending portion 122, thus improving the spacing efficiency between the arm 118 and the connector connecting portion 112. In this way, according to the present embodiment, the space saving function on the inside of the opening portion 108 can be achieved and a reduction in size of the entire charging connector 100 can be also realized.

Still furthermore, as shown in FIG. 5, according to the present embodiment, the extending portion 122 and the connector connecting portion 112 are arranged in a manner such that the center 132 in the longitudinal direction on the vertical cross section of the extending portion 122 and the center 130 of the connector connecting portion 112 provide the same height (in FIG. 5, represented by a line segment L3) in the Z direction. Consequently, it is possible to equalize the rigidity of the arm 118 in upper and lower portions of the arm 118.

In addition, according to the structure of the arm 118 including the extending portion 122, the width in the longitudinal direction (the Z direction) of the extending portion 122 (or the arm 118 shown in FIG. 2) can be set large without interference of the extending portion 122 with the edge of the opening portion 108 and the connector connecting portion 112. Furthermore, the extending portion 122 has the curved outer surface 126 so as to be protruded and the curved inner surface 128 so as to be recessed toward the outer lid hinge 120, the cross section of the extending portion 122 draws an arcuate (circular-arc) shape as a whole, and the high bending rigidity of the extending portion 122 can be provided (the extending portion 112 has a large geometrical moment of inertia). Therefore, the arm 118 (see FIG. 2) including the extending portion 122 can secure the high rigidity even if the arm 118 is made of resin, and it is also possible to form the outer lid member 106 and the arm 118 with the same resin material as a material of the rear bumper 104. It is further possible to obtain a sense of unity in design and improve an outer appearance.

It is to be noted that although the preferred embodiment of the present invention is described above with reference to the accompanying drawings, the present invention is not limited to the embodiment explained above, and many other changes and modifications or alternations may be made without departing from the scopes of the appended claims, and the changes and modifications naturally belong to a technical scope of the present invention.

INDUSTRIAL APPLICABILITY

The present invention can be utilized as a charging connector that is mounted to a vehicle provided with a battery chargeable from an external power supply, and a charging cable can be inserted into the charging connector.

REFERENCE NUMERALS

L1, L2, L3 - - - line segment
C1, C2 - - - circle
100 - - - charging connector
102 - - - vehicle
104 - - - rear bumper
106 - - - outer lid member
107 - - - casing
108 - - - opening portion
110 - - - bezel
112 - - - connector connecting portion
114 - - - inner lid member
115 - - - inner lid hinge
116 - - - locking member
118 - - - arm
120 - - - outer hinge member
122 - - - extending portion
124 - - - base portion
126 - - - outer surface
128 - - - inner surface
X-Y, Y-Z - - - plane

The invention claimed is:

1. A charging connector which charges a battery mounted on a vehicle from an external power supply through an opening portion formed to the vehicle, the charging connector comprising:
a connector connecting portion which is arranged in an inside of the opening portion and to which a plug of a cable for charging the battery of the vehicle is connected;
an outer lid member that covers the opening portion from an outside of the vehicle;
an arm made of resin axially supported on the inside of the opening portion, bent to detour an edge of the opening portion, and connected to the outer lid member;

an outer lid hinge located in the inside of the opening portion so as to pivot the arm in a plane substantially orthogonal to a plane formed by the opening portion; and an inner lid member, wherein the arm includes an extending portion connected to the outer lid member to draw an arcuate shape with the outer lid hinge being a center thereof and a base portion that couples the extending portion and the outer lid hinge, the opening portion is formed in a substantially arcuate shape at least in a vicinity of the arm and, in a vertical cross section taken along a plane formed by the opening portion, an outer surface of the extending portion opposing to an edge of the opening portion curves so as to be protruded toward the outer lid hinge and an inner surface of the extending portion on the connector connecting portion side curves so as to be recessed toward the outer lid hinge, the outer surface of the extending portion being formed in an arcuate shape extending along a shape of an inner circumference of the opening portion, and the inner lid member is disposed on an opposite side of the inner lid hinge with the connector connecting portion being interposed therebetween so as to seal the connector connecting portion in the inside of the opening position.

2. The charging connector according to claim 1, wherein, in the vertical cross section cut taken the plane formed by the opening portion, the inner surface of the extending portion is formed in an arcuate shape extending along a circle concentric with the connector connecting portion.

3. The charging connector according to claim 1, wherein the comprising an inner lid member that seals a connector connecting portion in the inside of the opening portion, wherein a distance from the plane formed by the opening portion to the outer lid hinge is set substantially equal to a distance from the above-mentioned plane to the inner lid member and equal to a locking portion for locking the inner lid member to the connector connecting portion.

* * * * *